United States Patent
Saito et al.

(10) Patent No.: US 6,503,997 B1
(45) Date of Patent: Jan. 7, 2003

(54) POLYURETHANE/POLYURETHANE-UREA RESIN AND PROCESS FOR PRODUCING THE SAME

(75) Inventors: Joichi Saito, Tokyo (JP); Josho Kashiwame, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/700,658

(22) PCT Filed: Mar. 17, 2000

(86) PCT No.: PCT/JP00/01656

§ 371 (c)(1),
(2), (4) Date: Nov. 17, 2000

(87) PCT Pub. No.: WO00/55230

PCT Pub. Date: Sep. 21, 2000

(30) Foreign Application Priority Data

Mar. 17, 1999 (JP) ............................................. 11-71584

(51) Int. Cl.⁷ ...................... C08G 18/12; C08G 18/40; C08G 18/66
(52) U.S. Cl. ............................. 528/61; 528/52; 528/65; 528/66; 528/76; 528/81
(58) Field of Search .............................. 528/61, 65, 66, 528/76, 81, 52

(56) References Cited

U.S. PATENT DOCUMENTS

| | | | |
|---|---|---|---|
| 5,106,874 A | | 4/1992 | Porter et al. |
| 5,691,441 A | * | 11/1997 | Seneker et al. ............... 528/61 |
| 5,998,574 A | * | 12/1999 | Fishback ..................... 528/417 |

FOREIGN PATENT DOCUMENTS

| | | |
|---|---|---|
| EP | 748828 A1 | 12/1996 |
| JP | 2-283712 A | 11/1990 |
| JP | 7-206965 A | 8/1995 |
| JP | 10-130360 A | 5/1998 |
| JP | 11-43529 A | 2/1999 |

* cited by examiner

*Primary Examiner*—Patricia A. Short
(74) *Attorney, Agent, or Firm*—Oblon, Spivak, McClelland, Maier & Neustadt, P.C.

(57) ABSTRACT

A polyurethane/polyurethane urea resin obtained by reacting an isocyanate group-terminated polyurethane prepolymer (A) obtained by reaction of high molecular weight active hydrogen compound and a polyisocyanate compound, with a chain extender (B), in a solvent and thereafter by removing the solvent, wherein the isocyanate group-terminated polyurethane prepolymer (A) is an isocyanate group-terminated polyurethane prepolymer obtained by reacting the following polyol (1) with a polyisocyanate compound in the presence of an excess amount of an isocyanate group, followed by reacting the following polyol (2) with the reaction product of polyol (1) in the presence of an excess amount of an isocyanate group;

Polyol (1): a polyoxyalkylene polyol having a hydroxyl group value of at most 70, a total unsaturation degree of at most 0.07 meq/g and an oxypropylene group content of at least 70 wt % containing a secondary hydroxyl terminal group, Polyol (2): polyoxytetramethylene glycol, polyester polyol, polycaprolactone polyol or a polycarbonate polyol.

17 Claims, No Drawings

POLYURETHANE/POLYURETHANE-UREA RESIN AND PROCESS FOR PRODUCING THE SAME

TECHNICAL FIELD

The present invention relates to a polyurethane type/polyurethane urea type resin obtained by reacting a novel isocyanate group-terminated polyurethane prepolymer with a chain extender such as an amine type chain extender and a method for producing the same

BACKGROUND ART

It is known to produce a polyurethane type/polyurethane urea type resin for an artificial leather or an elastic yarn by reacting a, polyisocyanate compound with a high molecular amount polyol such as polyoxytetramethylene glycol (hereinafter referred to as "PTMG") and a polyester polyol (hereinafter referred to as "PES") to prepare an isocyanate group-terminated polyurethane prepolymer, preparing a resin solution by reacting the prepolymer with a chain extender in a solvent and then subjecting the resin solution to processing treatment (solution polymerization method).

The polyurethane type/polyurethane urea type resin obtained by the above solution polymerization method has properties of a high elasticity, a high elongation, a high durability and the like, and is therefore usable as an elastic fiber for a stretch fabric material.

On the other hand, since this is poor in breaking strength, it has: been proposed to use a secondary hydroxyl group-terminated polyol such as polyoxypropylene polyol which has not been used alone, in combination with PTMG and PES for a polyurethane type/polyurethane urea type elastic yarn (WO98-16568). This international patent publication discloses to obtain an isocyanate group-terminated polyurethane prepolymer by reacting a polyisocyanate compound with a mixture of polyoxypropylene polyol and PTMG in view of physical properties, moldability and economic properties of a product.

However, according to the method of using a mixture of polyols disclosed in the above international patent publication, PTMG having a primary hydroxyl group terminal is first reacted with a polyisocyanate compound due to difference in reactivity of a hydroxyl group in polyol, and as this result, physical strength and heat resistance of the resin thus obtained are lowered.

Further, since polyoxypropylene polyol has a secondary hydroxyl group terminal, a reaction speed in the preparation of a prepolymer is low and it takes a very long time to prepare the prepolymer.

Also, for example, a major part of polyoxypropylene/oxyethylene polyol having at most 30 wt % of an oxyethylene group at the terminal is a primary hydroxyl group terminal, but a small amount of a secondary hydroxyl group terminal is also present, and therefore the same problem as mentioned above is raised even when using such a polyol..

Thus, the present invention provides a polyurethane type/polyurethane urea type resin and a method for producing the same, the strength and heat resistance of which can be greatly improved and the production time of which can be reduced, even when using polyoxypropylene polyol in combination with PTMG or PES.

DISCLOSURE OF THE INVENTION

In order to achieve the above object, the present invention provides a polyurethane type/polyurethane urea type resin obtained by reacting an isocyanate group-terminated polyurethane prepolymer (A) obtained by reaction of a high molecular weight active hydrogen compound and a polyisocyanate compound, with a chain extender (B), wherein said isocyanate group-terminated polyurethane prepolymer (A) is an isocyanate group-terminated polyurethane prepolymer obtained by reacting the following polyol (1) with a polyisocyanate compound under such a condition that an isocyanate group is excessively present and further by reacting the following polyol (2) with a polyisocyanate compound under such a condition that an isocyanate group is excessively present;

Polyol (1): a polyoxyalkylene polyol having a hydroxyl group value of at most 70, a total unsaturation degree of at most 0.07 meq/g and an oxypropylene group content of at least 70 wt %, and Polyol (2): a polyol selected from the group consisting of polyoxytetramethylene glycol (PTMG), polyester polyol, polycaprolactone polyol and polycarbonate polyol.

Also, the present invention provides a method for producing a polyurethane type/polyurethane urea type resin by reacting an isocyanate group-terminated polyurethane prepolymer (A) obtained by reaction of a high molecular weight active hydrogen compound and a polyisocyanate compound, with a chain extender (B), wherein the isocyanate group-terminated polyurethane prepolymer (A) is an isocyanate group-terminated polyurethane prepolymer obtained by reacting a polyisocyanate compound with said polyol (1) in the presence of an excess amount of an isocyanate group and further reacting with said polyol (2) in the presence of an excess amount of an isocyanate group.

Further, the present invention provides a method for producing a polyurethane type/polyurethane urea type resin by reacting an isocyanate group-terminated polyurethane prepolymer (A) obtained by reaction of a high molecular weight active hydrogen compound and a polyisocyanate compound with a chain extender (B) in a solvent and removing the solvent, wherein the isocyanate group-terminated polyurethane prepolymer (A) is an isocyanate group-terminated polyurethane prepolymer obtained by reacting a polyisocyanate compound with said polyol (1) in the presence of an excess amount of an isocyanate group and further reacting with said polyol (2) in the presence of an excess amount of an isocyanate group.

According to the present invention, by using the isocyanate group-terminated polyurethane prepolymer obtained by reacting a polyisocyanate compound with said polyol (1) and further reacting with said polyol (2), the above reaction can be completed in a short time and a polyurethane type/polyurethane urea type resin excellent in strength and heat resistance can be obtained. The polyurethane type/polyurethane urea type resin thus obtained is suitable as a material for an artificial leather, an elastic yarn and the like.

BEST MODE FOR CARRYING OUT THE INVENTION

The "polyurethane type/polyurethane urea type resin" of the present invention indicates a "polyurethane urea resin" prepared by using mainly a diamine compound as a chain extender and a "polyurethane resin" prepared by using mainly a polyol compound as a chain extender.

In the present invention polyol (1) is a polyoxyalkylene polyol having a hydroxyl group value of at most 70, a total unsaturation degree of at most 0.07 meq/g and an oxypropylen group content of at least 70 wt %. Polyol (1) may be a mixture. Also, if necessary, it may be used in combination with other polyoxyalkylene polyol having a hydroxyl group value, a total unsaturation degree and an oxypropylene group content outside the above-mentioned ranges. In such a case, it is necessary that an average hydroxyl group value, an average total unsaturation degree and an average oxypropylene content are within the above-mentioned respective ranges.

The hydroxyl group value of polyol (1) is preferably from 5 to 60. If the hydroxyl group value exceeds 70, a satisfactory flexibility can not be obtained, and if the hydroxyl group value is less than 5, a satisfactory strength can not be obtained.

Also, the total unsaturation degree of polyol (1) is preferably at most 0.04 meq/g and is preferably at most 0.02 meq/g particularly when the hydroxyl group value of polyol (1) is relatively high (e.g. hydroxyl group value=28 to 70). If the total unsaturation degree is higher than the above-mentioned value, it is not preferably since a residual tack is increased and a strength is lowered.

Also, the oxypropylene group content is preferably at least 85 wt %.

The above-mentioned polyol (1) can be obtained by reacting propylene oxide or propylene oxide and other monoepoxide with a polyfunctional initiator in the presence of a catalyst such as diethyl zinc, iron chloride, metal porphyrin, double metal cyanide complex or the like.

In the present invention, it is particularly preferable to use double metal cyanide complex. Among them, a complex comprising zinc hexacyanocobaltate as the main component is preferable, and its ether and/or alcohol complex is particularly preferable. The composition disclosed in JP-B-46-27250 is essentially usable.

Examples of the above ether include preferably ethylene glycol dimethyl ether (glyme), diethylene glycol dimethyl ether (diglyme) and the like, and glyme is particularly preferable in view of easy handling in the preparation of a complex.

Examples of the above alcohol include preferably t-butanol, t-butyl cellosolve and the like.

In the present invention, when an alkali catalyst such as potassium hydroxide is used, an unsaturation degree of a high molecular weight material becomes unpreferably high.

In the present invention, monoepoxide is a compound having one epoxy ring, and it is preferable to use propylene oxide or propylene oxide and other monoepoxides. Examples of other epoxides usable in combination with propylene oxide include ethylene oxide, 1,2-butylene oxide, 2,3-butylene oxide, styrene oxide, glycidyl ether, glycidyl ester and the like, and ethylene oxide is particularly preferable. Also, they may be used in a combination of two or more.

The above initiator is preferably a compound having 2 to 10, more preferably 2 to 8 active hydrogen atoms, and a polyhydroxy compound is preferable. A polyhydroxy compound having 2 to 4 hydroxyl groups is more preferable, and a polyhydroxy compound having 2 to 3 hydroxyl groups is most preferable. Examples of the polyhydroxy compound include ethylene glycol, diethylene glycol, propylene glycol, dipropylene glycol, 2,2-dimethyl-1,3-propanediol, 1,4-butanediol, 1,6-hexanediol, glycerin, trimethylolpropane, pentaerythritol, diglycerin, sucrose and a polyol having a molecular weight lower than an aimed product obtained by reacting a monoepoxide with the above-mentioned polyhydroxy compounds, and a polyol having a molecular weight lower than an aimed product obtained by reacting a monoepoxide with a monoamine, a polyamine, an alkanolamine or the like. These may be used one or two or more. In the present invention, polyol (2) is a polyol selected from the group consisting of PTMG, PES, polycaprolactone polyol and polycarbonate polyol.

Polyol (2) has a hydroxyl group value of 5 to 70, preferably 28 to 70, more preferably 30 to 60. Polyol (2) has a hydroxyl group number of preferably 2 to 4, particularly 2.

PTMG is obtained by ring-opening polymerization of tetrahydrofuran.

Examples of PES include a material obtained by reacting one or a mixture of two or more dibasic acids selected from oxalic acid, malonic acid, succinic acid, glutaric acid, adipic acid, sebacic acid, fumaric acid, maleic acid, itaconic acid and the like with one or a mixture of two or more diols having a primary hydroxyl group only selected from ethylene glycol, 1,3-propanediol, 1,4-butanediol,.2,2-dimethyl-1, 3-propanediol, 1,6-hexanediol, cyclohexane dimethanol and the like, and a material obtained by reacting said dibasic acid, said diol compound and one or a mixture of two or more at least trihydric alcohol compounds having a primary hydroxyl group only such as trimethylol propane, pentaerythritol or the like. Also, there may be used a material obtained by reacting the polyester having a terminal carboxyl group obtained by reaction in the presence of an excess amount of a carboxyl group excessive to a hydroxyl group, further with polyether diol such a polyoxyethylene diol, PTMG, polyoxypentamethylene diol or the like.

Examples of the polylactone polyol is a polyol obtained by ring-opening polymerization of a cyclic ester of ε-caprolactone or the like as an initiator.

Also, the polycarbonate polyol is preferably a polycarbonate diol obtained from poly(propane-1,3-carbonate)diol, poly(butane-1,4-carbonate)diol, poly(pentane-1,5-carbonate)diol, poly(hexane-1,6-carbonate)diol and their copolymers and mixtures obtained by reacting alkylene carbonates with 1,3-propanediol, 1,4-butanediol, 1,5-pentanediol, 1,6-hexanediol or the like.

In the present invention, the polyisocyanate compound to be used is a diisocyanate compound. For example, the following compounds are preferably used.

Aliphatic diisocyanates: 1,3-propane diisocyanate, 1,4-butane diisocyanate, 1,5-pentane diisocyanate, 1,6-hexane diisocyanate, 3-methylhexane-1,6-diisocyanate, and 3,3-dimethylpentane-1,5-diisocyanate, and the like.

Cycloaliphatic diisocyanates: 1,3- and 1,4-cyclohexylene diisocyanate, isophorone diisocyanate, and the like.

Aromatic diisocyanates: m- and p-xylylene diisocyanate, α, α, α', α'-tetramethyl-p-xylylene diisocyanate, 1,4-phenylene diisocyanate, 4,4'-diphenylmethane diisocyanate (hereinafter referred to as "MDI"), 4,4'-diphenyl ether diisocyanate, 1,5-naphthalene diisocyanate, 2,6-naphthalene diisocyanate, tolidine diisocyanate, tolylene diisocyanate, and the like.

In the present invention, when producing an isocyanate group-terminated polyurethane prepolymer (hereinafter referred to simply as "prepolymer"), polyol (1) and polyol (2) are used preferably in a weight ratio of polyol (1)/polyol (2) of from 5/95 to 70/40, more preferably from 10/90 to 60/40. Further, the amount of polyol (2) is preferably at least 1 mol, more preferably from 1 to 50 mols, most preferably from 1 to 20 mols to 1 mol of polyol (1). An amount of an isocyanate group in the polyisocyanate compound is preferably in the range of from 1.2 to 3.0 mols, more preferably from 1.4 to 2.0 mols, to 1 mol of a total amount of a hydroxyl group contained in polyol (1) and polyol (2).

If the amount of an isocyanate group is less than 1.2 mols, the viscosity of a prepolymer obtained becomes too high, and it becomes hard to handle the prepolymer. On the other hand, if the amount of an isocyanate group exceeds 3.0 mols, a polyurethane type/polyurethane urea type resin obtained becomes unpreferably poor in strength and elongation properties.

The number of a hydroxyl group of polyol (1) is -preferably an average number of a hydroxyl group (hereinafter referred to as "substantial average hydroxyl group number") determined by taking the number of a hydroxyl group of an unsaturated group-containing monool component calculated based on a total unsaturation degree into consideration. A substantial average hydroxyl group number f of polyol can be calculated in the following manner, wherein $M_{nm}$ represents a number average molecular weight of an unsaturated group-containing monool contained in polyol, $M_{np}$ represents a number average molecular weight of polyol, N represents a number of active hydrogen atom of an initiator of polyol and $M_{nm}=M_{np}/N$.

$$A=M_{nm} \times USV/1000$$

$$M_{np}=56.11 \times 1000 \times N/OHV$$

$$f=((1-A) \times N/M_{np}+A/M_{nm})/((1-A)/M_{np}+A/M_{nm})$$

wherein hydroxyl group value: OHV, total unsaturation degree: USV.

An isocyanate-containing ratio of an isocyanate group-terminated polyurethane prepolymer obtained is preferably from 0.5 to 5 wt %.

On the other hand, a chain extender (B) used in the present invention is a diamine compound or a polyol compound as illustrated below, and a diamine compound is particularly preferable.

Diamine Compound

A diamine compound having an aromatic ring and an aliphatic diamine compound are preferably used.

Preferable examples of the diamine compound having an aromatic ring include an aromatic diamine compound having an amino group directly bonded to an aromatic ring and a diamine compound having an amino group bonded to an aromatic ring by way of an alkylene group.

Thus, examples of the diamine compound having an aromatic ring include diaminobenzene, 2,4-diaminotoluene, 2,6-diaminotoluene, 4,4'-diaminodiphenylmethane, 3,3'-dimethyl-4,4'-diaminodiphenylmethane, 3,3,-diethyl-4,4'-diaminodiphenylmethane, 3,5-diethyl-2,4-diaminotoluene, 3,5-diethyl-2,6-diaminotoluene, m-xylylenediamine, p-xylylenediamine, and the like, and m-xylylene diamine is particularly preferable.

Further, examples of the aliphatic diamine include ethylenediamine, propylenediamine, hexamethylendiamine, and the like, and examples of the cycloaliphatic diamine include isophoronediamine, 1,4-cyclohexanediamine, piperazine, piperazine derivative and the like.

Polyol Compound

A polyol compound is preferably a compound having a molecular weight of at most 500 and at least 2 active hydrogen-containing groups reactive with an isocyanate group, examples of which include ethylene glycol, 1,4-butanediol, 1,5-pentanediol, 1,6-hexanediol, diethylene glycol, 1,4-bis(2-hydroxyethoxy)benzene, and the like, and 1,4-butanediol and 1,4-bis (2-hydroxyethoxy) benzene are particularly preferable.

Examples of a solvent used in the present invention include N,N-dimethylformamide, N,N-dimethylacetamide, dimethylsulfoxide, and the like, and a water soluble polar solvent is preferable.

A polyurethane type/polyurethane urea type resin of the present invention can be produced in the following manner. That is, polyol (1) as a high molecular amount active hydrogen compound is reacted with a polyisocyanate compound in the presence of an excess amount of an isocyanate group, and after finishing the reaction, polyol (2) is further reacted therewith in the presence of an excess amount of an isocyanate group to prepare an isocyanate group-terminated polyurethane prepolymer (A) of the present invention. The prepolymer (A) thus prepared was dissolved in a solvent to obtain a prepolymer solution, and a chain extender (B) is added to the prepolymer solution to carry out polymerization reaction to obtain a polyurethane type/polyurethane urea type resin solution having a concentration of from 15 to 40 wt %. Thereafter, the solvent is removed from the polyurethane type/polyurethane urea type resin solution to obtain a polyurethane type/polyurethane urea type resin.

An amount of the chain extender (B) used in the present invention is such an amount that an amount of an amino group or a hydroxyl group of the chain extender (B) is preferably from 80 to 105 mol % of an amount of an isocyanate group of the prepolymer solution. If the amount of the chain extender (B) is outside the above-mentioned range, a polymer molecular weight becomes too large or too small, and the polymer obtained becomes hardly moldable or a resin having a high strength can not be obtained. Also, in this case, a terminal group-terminating agent such as diethylamine, dibutylamine or diethanolamine may be used as a molecular weight-adjusting agent for the polymer.

In the present invention, a preferable temperature for chain-extending reaction (solution polymerization) to react the prepolymer with the chain extender (B) in a solvent is from 0 to 30° C. If the temperature is lower than this range, solubility of the prepolymer is lowered and reaction system becomes heterogeneous. On the other hand, if the temperature exceeds the above range, the reaction of an isocyanate group and an amino group becomes unusually fast, and it becomes difficult to control the reaction.

Also, it is preferable that a molar ratio of a mol number of an active hydrogen-containing group contained in polyol (1), polyol (2) and chain extender (B) and a mol number of an isocyanate group contained in a polyisocyanate compound is within the following range.

(mol number of isocyanate group)/(mol number of active hydrogen-containing group)=0.95–1.10

If the above molar ratio value is outside the above-mentioned range, a satisfactory strength can not be obtained and a durability is poor.

Further, a polyurethane type/polyurethane urea type resin of the present invention may contain various additives such as an antioxidant, a UV ray absorber and the like.

When the polyurethane type/polyurethane urea type resin of the present invention is used for an artificial leather, the artificial leather can be obtained by removing a solvent from the polyurethane type/polyurethane urea type resin solution obtained in the above-mentioned reaction.

Also, when the polyurethane type/polyurethane urea type resin of the present invention is used for an elastic yarn, the elastic yarn can be obtained by subjecting the polyurethane type/polyurethane urea type resin solution obtained in the above-mentioned reaction to dry spinning-process.

EXAMPLES

Hereinafter, the present invention is further illustrated with reference to Examples.

The term "part" used in the Examples means "part by weight".

As a starting material for a polyurethane type elastomer in each Example, the following polyoxyalkylene polyol was used.

Polyols A, B, and D to F were prepared by addition polymerization of propylene oxide by using a polyoxypropylene polyol having a molecular weight of from 400 to 600 as an initiator and a zinc hexacyanocobaltate complex as a catalyst and by removing the catalyst.

Polyol C was prepared by addition polymerization of propylene oxide in the same manner as above, deactivating the catalyst, and further by addition polymerization of ethylene oxide in the presence of an alkali catalyst and then purifying the reaction product to remove the catalyst component.

An active hydrogen atom number (N') of each initiator, and an oxypropylene group content (PO), a hydroxyl group value (X), a total unsaturation degree (Y) and a substantial average hydroxyl group number (f) of each of the above prepared polyoxyalkylene polyols are shown in the following Table 1.

In the Examples, "polyol PTMG" is PTMG manufactured by Hodogaya Chemical Co., Ltd., tradename "PTG2000SN" (molecular weight: 2,000, hydroxyl group value: 56).

TABLE 1

| Name | N' | PO (wt %) | X (mgKOH/g) | Y (meq/g) | f |
| --- | --- | --- | --- | --- | --- |
| Polyol A | 2 | 99.8 | 11 | 0.029 | 1.742 |
| Polyol B | 3 | 99.1 | 17 | 0.025 | 2.575 |
| Polyol C | 2 | 89.6 | 28 | 0.019 | 1.927 |
| Polyol D | 3 | 98.2 | 33 | 0.019 | 2.818 |
| Polyol E | 2 | 99.1 | 56 | 0.013 | 1.974 |
| Polyol F | 3 | 96.9 | 56 | 0.013 | 2.924 |
| Polyol G | 2 | 89.6 | 28 | 0.008 | 1.968 |

Example 1

Polyol A (177 parts) and polyol B (78 parts) were mixed to provide a substantial average hydroxyl group number of 2.0, and MDI (147 parts) was added thereto, and the resultant mixture was reacted at 80° C. for 3 hours in a nitrogen atmosphere. The isocyanate content of the reaction product was 11.55 wt %. Polyol PTMG (597 parts) was added thereto, and the resultant mixture was further reacted for 3 hours under the same conditions to obtain an isocyanate group-terminated polyurethane prepolymer (prepolymer P1) having an isocyanate content of 2.14 wt %. The above isocyanate content value was lower than a theoretical value of 2.25 wt % in the case that all of the polyol compounds are completely reacted with the polyisocyanate compound, and it was therefore considered that the reaction was completely finished. The above reaction could be carried out without using a urethane-forming catalyst.

The prepolymer P1 thus obtained was dissolved in N,N-dimethylacetamide (hereinafter referred to as "DMAc") to obtain a urethane prepolymer solution having a solid content of 30 wt %.

Thereafter, a mixture of m-xylylenediamine (0.75 part) and diethylamine (0.09 part) was dissolved in DMAc so as to make a concentration of 30%, and the solution thus obtained was dropwise added as a curing agent solution to the urethane prepolymer solution (100 parts by weight) vigorously stirred at room temperature to carry out a polymerization reaction to obtain a polyurethane urea resin solution.

DMAc was evaporated and the polyurethane urea resin solution was dried to obtain a film-like sample having a thickness of 200 μm.

Example 2

Polyol C (227 parts) and polyol D (25 parts) were mixed to provide a substantial average hydroxyl group number of 2.0, and MDI (161 parts) was added to the resultant mixture, and the mixture was reacted at 80° C. for 3 hours in a nitrogen atmosphere. The reaction product had an isocyanate content of 11.75 wt %. To the reaction product, was added 587 parts of N-4042 (PES manufactured by Nippon Polyurethane Kogyo K.K., obtained by reacting adipic acid and 1,4-butanediol and ethylene glycol, molecular weight: 2000, hydroxyl group value: 56), and the mixture was further reacted for 3 hours under the same conditions to obtain an isocyanate group-terminated polyurethane prepolymer (prepolymer P2) having an isocyanate content of 2.35 wt %. Since the above isocyanate content value was lower than a theoretical value of 2.39 wt % in the case that all of the polyol compounds and the polyisocyanate compound are reacted, it was therefore considered that the reaction was completely finished. The above reaction could be carried out without using a urethane-forming catalyst.

The prepolymer P2 thus obtained was dissolved in N,N-dimethylformamide (hereinafter referred to as "DMF") to obtain a urethane prepolymer solution having a solid content of 30 wt %.

Thereafter, a mixture of ethylenediamine (0.32 part) and diethylamine (0.2 part) was dissolved in DMF to make a concentration of 30%, and the mixture was dropwise added as a curing agent solution to the urethane prepolymer solution (100 parts) vigorously stirred at 15° C. to carry out a polymerization reaction to obtain a polyurethane urea resin solution.

DMF was evaporated and the polyurethane urea resin solution was dried to obtain a film-like sample having a thickness of 200 μm.

Example 3

Polyol E (235 parts) and polyol F (10 parts) were mixed to provide a substantial average hydroxyl group number of 2.0, and MDI (184 parts) was added to the resultant mixture, and the mixture was reacted at 80° C. for 3 hours in a nitrogen atmosphere. The reaction product had an isocyanate content of 11.90 wt %. Further, polyol PTMG (571 parts) was added to the reaction product and the mixture was further reacted for 3 hours under the same conditions to obtain an isocyanate group-terminated polyurethane prepolymer (prepolymer P3) having an isocyanate content of 2.60 wt %. The above isocyanate content value was lower than a theoretical value of 2.71 % in the case that all of the polyol compounds were completely reacted with the polyisocyanate compound, and it was therefore considered that the reaction was completely finished. The above reaction could be carried out without using an urethane-forming catalyst.

The prepolymer P3 thus obtained was dissolved in DMAc to obtain a urethane prepolymer solution having a solid content of 30 wt %.

Thereafter, a mixture of m-xylylenediamine (0.91 part) and diethylamine (0.11 part) was dissolved in DMAc to make a concentration of 30%, and the resultant solution was dropwise added as a curing agent solution to the urethane prepolymer solution (100 parts) vigorously stirred at room temperature to carry out a polymerization reaction to obtain a polyurethane urea resin solution.

DMAc was evaporated, and the polyurethane urea resin solution was dried to obtain a film-like sample having a thickness of 200 µm.

Example 4

MDI (161 parts) was added to polyol G (227 parts), and the mixture was reacted at 80° C. for 3 hours in a nitrogen atmosphere. The reaction product had an isocyanate content of 11.75 wt %. PTMG (molecular weight: 2000, hydroxyl group value: 56) (588 parts) was added to the reaction product, and the mixture was further reacted for 3 hours under the same conditions to obtain an isocyanate group-terminated polyurethane prepolymer (prepolymer P4) having an isocyanate content of 2.35 wt %. The above isocyanate content value was lower than a theoretical value of 2.39 % in the case that all of the polyol compounds were reacted with the polyisocyanate compound, and it was therefore considered that the reaction was completely finished. The above reaction could be carried out without using a urethane-forming catalyst.

The prepolymer P4 thus obtained was dissolved in DMAc to obtain a urethane prepolymer solution having a solid content of 30 wt %.

Thereafter, a mixture of m-xylylenediamine (0.98 part) and diethylamine (0.16 part) was dissolved in DMAc to make a concentration of 30%, and the resultant solution was dropwise added as a curing agent solution to the urethane pre polymer solution (100 parts) vigorously stirred at room temperature to carry out a polymerization reaction t o obtain a polyurethane urea resin solution.

DMAc was evaporated and the polyurethane urea resin solution was dried to obtain a film-like sample having a thickness of 200 µm.

Comparative Example 1

Polyol A (177 parts), polyol B (78 parts), polyol PTMG (597 parts;) and MDI (147 parts) were mixed and reacted at 80° C. for 40 hours in a nitrogen atmosphere. The reaction product (prepolymer Q1) had an isocyanate content of 2.2 wt %. Since the above isocyanate content value was lower than a theoretical value of 2.2 wt % in the case that all of the polyol compounds were completely reacted with the polyisocyanate compound, it was considered that the reaction was completely finished but a very long time was taken.

The prepolymer Q1 thus obtained was dissolved in DMAc to obtain a urethane prepolymer solution having a solid content of 30 wt %.

Thereafter, a mixture of m-xylylenediamine (0.77 part) and diethylamine (0.092 part) was dissolved in DMAc to make a concentration of 30%, and the resultant solution was dropwise added as a curing agent solution to the urethane prepolymer solution (100 parts) vigorously stirred at room temperature to make a polymerization reaction to obtain a polyurethane urea resin solution.

DMAc was evaporated and the polyurethane urea resin solution was dried to obtain a film-like sample having a thickness of 200 µm.

Comparative Example 2

Polyol A (659 parts), polyol B (292 parts) and MDI (490 parts) were mixed, and the mixture was reacted at 80° C. for 30 hours in a nitrogen atmosphere. The reaction product (prepolymer Q2) had an isocyanate content of 0.72 wt %. The above isocyanate content value was lower than a theoretical value of 0.73 wt % in the case that all of the polyol compounds were completely reacted with the polyisocyanate compound, and it was therefore considered that the reaction was completely finished, but a very long time was taken.

The prepolymer Q2 (30 parts) and a prepolymer (prepolymer Q3) (70 parts) having an isocyanate content of 2.1 wt % obtained by reacting polyol PTMG and MDI were dissolved in DMAc to obtain a urethane prepolymer solution having a solid content of 30 wt %.

Thereafter, a mixture of m-xylylenediamine (0.59 part) and diethylamine (0.07 part) was dissolved in DMAc to make a concentration of 30%, and the solution was dropwise added as a curing agent solution to the urethane prepolymer solution (100 parts) vigorously stirred to make a polymerization reaction to obtain a polyurethane urea resin solution.

DMAc was evaporated, and the polyurethane urea resin solution was dried to obtain a film-like sample having a thickness of 200 µm.

Comparative Example 3

The prepolymer Q2 (30 parts), and the prepolymer Q3 (70 parts) were dissolved in DMF to obtain a urethane prepolymer solution having a solid content of 30 wt %.

Thereafter, a mixture of diethylamine (0.23 part) and diethylamine (0.14 part) was dissolved in DMAc to make a concentration of 30%, and the solution was dropwise added as a curing agent solution to the urethane prepolymer solution (100 parts) vigorously stirred at 15° C. to carry out a polymerization reaction to obtain a polyurethane urea resin solution.

DMAc was evaporated, and the polyurethane urea resin solution was dried to obtain a film-like sample having a thickness of 200 µm.

A film-like sample obtained in each of the above Examples 1 to 4 and Comparative Examples 1 to 3 was subjected to aging at room temperature for 10 days, and its physical properties were measured, and the results are shown in the following Table 2. Also, each sample was heated at 100° C. for 1 week, and its breaking strength was measured and retention of breaking strength was calculated. The results are shown in the following Table 3.

TABLE 2

|  | Elongation (%) | 100% Modulus (kg/cm$^2$) | Breaking strength (kg/cm$^2$) |
| --- | --- | --- | --- |
| Example 1 | 950 | 15 | 290 |
| Example 2 | 900 | 23 | 350 |
| Example 3 | 930 | 28 | 450 |
| Example 4 | 960 | 23 | 430 |
| Comparative Example 1 | 650 | 13 | 90 |
| Comparative Example 2 | 850 | 14 | 210 |
| Comparative Example 3 | 800 | 10 | 80 |

TABLE 3

| | Breaking strength (kg/cm$^2$) | Retention of breaking strength (%) |
|---|---|---|
| Example 1 | 203 | 70 |
| Example 2 | 284 | 81 |
| Example 3 | 293 | 65 |
| Example 4 | 340 | 79 |
| Comparative Example 1 | 27 | 30 |
| Comparative Example 2 | 74 | 35 |
| Comparative Example 3 | 8 | 10 |

As evident from Table 2, the polyurethane urea resin of Example 1 of the present invention is excellent in elongation and breaking strength as compared with Comparative Example 1. Also, the polyurethane urea resins of Examples 3 and 4 using polyols E, F and G, the total unsaturation degree of which is low, were excellent in elongation, 100% Modulus and breaking strength. In the same manner, as evident from Table 3, the polyurethane resin of Example 1 is excellent also in heat resistance as compared with Comparative Example 1.

Example 5

1,4-butanediol (hereinafter referred to as "1,4-BD") (2.3 parts) heated at 40° C. was added to prepolymer P1 (100 parts) of Example 1 heated at 40° C., and the mixture was stirred for 5 minutes in a nitrogen atmosphere, and was reacted in a metal mold at 120° C. for 12 hours, and the reaction product was pulverized and was palletized by a uniaxial extruder, and the resultant material was extrusion-molded to obtain a polyurethane resin sheet having a thickness of 3 mm.

Example 6

1,4-bishydroxyethoxybenzene (hereinafter referred to as "BHEB") (5.5 parts) heated at 110° C. was added to prepolymer P2 (100 parts) of Example 2 heated at 90° C., and the mixture was stirred for 2 minutes in a nitrogen atmosphere, and was further reacted in a metal mold at 120° C. for 12 hours, and the reaction product was pulverized and was palletized by a uniaxial extruder. The material thus obtained was extrusion-molded to obtain a polyurethane resin sheet having a thickness of 3 mm.

Example 7

1,4-BD (2.8 parts) heated at 40° C. was added to prepolymer P3 (100 parts) of Example 3 heated at 40° C., and the mixture was stirred for 5 minutes in a nitrogen atmosphere, and was further reacted in a metal mold at 120° C. for 12 hours, and the reaction product was pulverized and was pelletized by a uniaxial extruder, and the material thus obtained was extrusion-molded to obtain a polyurethane resin sheet having a thickness of 3 mm.

Example 8

1,4-BD (2.5 parts) heated at 40° C. was added to prepolymer P4 (100 parts) of Example 4 heated at 40° C., and the mixture was stirred for 5 minutes in a nitrogen atmosphere, and was further reacted in a metal mold at 120° C. for 12 hours, and the reaction product was pulverized and was pelletized by a uniaxial extruder, and the material thus obtained was extrusion-molded to obtain a polyurethane resin sheet having a thickness of 3 mm.

Comparative Example 4

BHEB (5.2 parts) heated at 110° C. was added to prepolymer Q1 (100 parts) of Comparative Example 1 heated at 90° C., and the mixture was stirred for 2 minutes in a nitrogen atmosphere, and was further reacted in a metal mold at 120° C. for 12 hours, and the reaction product was pulverized and was pelletized by a uniaxial extruder, and the material thus obtained was extrusion-molded to obtain a polyurethane resin sheet having a thickness of 3 mm.

Comparative Example 5

Prepolymer Q2 (30 parts) and prepolymer Q3 (70 parts) were heated at 40° C., and 1,4-BD (1.81 parts) heated at 40° C. was added thereto, and the mixture was stirred for 5 minutes in a nitrogen atmosphere, and the mixture was reacted in a metal mold at 120° C. for 12 hours, and the reaction product was pulverized and was pelletized by a uniaxial extruder, and the material thus obtained was extrusion-molded to obtain a polyurethane resin sheet having a thickness of 3 mm.

A sheet-like sample obtained in each of the above Examples 5 to 7 and Comparative Examples 4 to 5 was subjected to aging at room temperature for 10 days, and its physical properties were measured, and the results are shown in the following Table 4. Also, each sample was heated at 100° C. for 1 week, and its breaking strength was measured and retention of the breaking strength was calculated. The results are shown in the following Table 5.

TABLE 4

| | Elongation (%) | 100% Modulus (kg/cm$^2$) | Breaking strength (kg/cm$^2$) |
|---|---|---|---|
| Example 5 | 1050 | 17 | 270 |
| Example 6 | 950 | 20 | 320 |
| Example 7 | 970 | 21 | 350 |
| Example 8 | 980 | 20 | 350 |
| Comparative Example 4 | 650 | 11 | 60 |
| Comparative Example 5 | 500 | 10 | 30 |

TABLE 5

| | Breaking strength (kg/cm$^2$) | Retention of breaking strength (%) |
|---|---|---|
| Example 5 | 175 | 65 |
| Example 6 | 224 | 70 |
| Example 7 | 210 | 60 |
| Example 8 | 200 | 57 |
| Comparative Example 4 | 18 | 30 |
| Comparative Example 5 | 7 | 23 |

As evident from Table 4, the polyurethane resin of Example 5 is excellent in elongation and breaking strength as compared with Comparative Example 4. In the same manner, as evident from Table 5, the polyurethane resin of Example 4 is excellent in heat resistance as compared with Comparative Example 4.

Example 9

As a polyol, polyol E, polyol F and polyol PTMG were used in combination to prepare an isocyanate group-terminated polyurethane prepolymer. A mixing ratio of polyols E, F and PTMG was varied as illustrated in the following Table 6.

In Examples 9-1 to 9-5, all the polyols were charged into reaction system by one step, and were reacted with MDI by one step (corresponding to Comparative Examples). On the other hand, in Examples 9-6 to 9-8, polyol E and polyol F only were previously reacted with MDI, and after finishing the reaction, polyol PTMG was further reacted therewith (preparation by two steps) (corresponding to Examples). In all cases, an isocyanate group content was 1.9 wt %.

TABLE 6

| Ex. | Polyol E (part) | Polyol F (part) | Polyol PTMG (part) | MDI (part) | Elongation (%) | Breaking strength (kg/cm$^2$) |
|---|---|---|---|---|---|---|
| 9-1 | 80.0 | 3.4 | 0 | 16.6 | 750 | 230 |
| 9-2 | 64.0 | 2.7 | 16.7 | 16.6 | 790 | 250 |
| 9-3 | 40.0 | 1.7 | 41.7 | 16.7 | 820 | 305 |
| 9-4 | 16.0 | 0.7 | 66.6 | 16.7 | 850 | 380 |
| 9-5 | 0 | 0 | 83.3 | 16.7 | 890 | 450 |
| 9-6 | 64.0 | 2.7 | 16.7 | 16.6 | 810 | 305 |
| 9-7 | 40.0 | 1.7 | 41.7 | 16.7 | 905 | 390 |
| 9-8 | 16.0 | 0.7 | 66.6 | 16.7 | 920 | 430 |

Each prepolymer was dissolved in MDAc to obtain a urethane prepolymer solution having a solid content of 30%.

Thereafter, a mixture of m-xylylenediamine (0.83 part) and diethylamine (0.10 part) was dissolved in DAMc to make a concentration of 30%, and the solution was dropwise added as a curing agent solution to the prepolymer solution (100 parts) vigorously stirred at room temperature to carry out a polymerization reaction to obtain a polyurethane urea resin solution.

DMAc was evaporated, and the polyurethane urea resin solution was dried to obtain a film-like sample having a thickness of 200μ.

The film thus obtained was subjected to aging at room temperature for 10 days, and its physical properties were measured, and the results are shown in Table 7.

As evident from comparison between Example 9-2 and Example 9–6, comparison between Example 9-3 and Example 9-7 and comparison between Example 9-4 and Example 9-8, even when compositions are the same, physical properties of polyurethanes obtained become different depending on the difference between the preparation processes.

INDUSTRIAL APPLICABILITY

As described above, according to the present invention, reaction can be finished in a short time even when polyoxypropylene polyol is used in combination with PTMG or PES compound in the preparation of an isocyanate group-terminated polyurethane prepolymer. Also, a polyurethane type/polyurethane urea type resin having a higher strength and a higher heat resistance can be obtained.

What is claimed is:

1. A polyurethane/polyurethane urea resin obtained by reacting an isocyanate group-terminated polyurethane prepolymer (A) obtained by reaction of a high molecular weight active hydrogen compound and a polyisocyanate compound, with a chain extender (B), wherein the isocyanate group-terminated polyurethane prepolymer (A) is an isocyanate group-terminated polyurethane prepolymer obtained by (a) reacting the following polyol (1) with a polyisocyanate compound in the presence of an excess amount of an isocyanate group until the reaction is essentially complete, followed by (b) further reacting the following polyol (2) with the reaction product of (a) in the presence of an excess amount of an isocyanate group, the weight ratio of polyol (1)/polyol (2) being from 5/95 to 70/40;

Polyol (1): a polyoxyalkylene polyol having a hydroxyl group value of at most 70, a total unsaturation degree of at most 0.07 meq/g and an oxypropylene group content of at least 70 wt % and containing a secondary hydroxyl terminal group, Polyol (2): a polyol selected from the group consisting of polyoxytetramethylene glycol, polyester polyol, polycaprolactone polyol and polycarbonate polyol.

2. The polyurethane/polyurethane urea resin according to claim 1, wherein the polyol (1) is a polyoxyalkylene polyol obtained by reacting a monoepoxide by using a double metal cyanide complex catalyst in the presence of an initiator.

3. A method comprising forming a polyurethane/polyurethane urea resin according to claim 1 into an artificial leather or an elastic yarn.

4. The polyurethane/polyurethane urea resin of claim 1, wherein said chain extender (B) is a polyol or a diamine.

5. The polyurethane/polyurethane urea resin of claim 1, wherein said chain extender (B) is a diamine.

6. A method for producing a polyurethane/polyurethane urea resin by reacting an isocyanate group-terminated polyurethane prepolymer (A) obtained by reaction of a high molecular weight active hydrogen compound and a polyisocyanate compound, with a chain extender (B), wherein the isocyanate group-terminated polyurethane prepolymer (A) is an isocyanate group-terminated polyurethane prepolymer, comprising (a) reacting the following polyol (1) with a polyisocyanate compound in the presence of an excess amount of an isocyanate group until the reaction is essentially complete, followed by (b) further reacting the following polyol (2) with the reaction product of (a) in the presence of an excess amount of an isocyanate group, wherein the weight ratio of polyol (1)/polyol (2) is from 5/95 to 70/40:

Polyol (1): a polyoxyalkylene polyol having a hydroxyl group value of at most 70, a total unsaturation degree of at most 0.07 meq/g and an oxypropylene group content of at least 70 wt % containing a secondary hydroxyl terminal group, Polyol (2): a polyol selected from the group consisting of polyoxytetramethylene glycol, polyester polyol, polycaprolactone polyol and polycarbonate polyol.

7. The method for producing the polyurethane/polyurethane urea resin according to claim 6, wherein the polyol (1) is a polyoxyalkylene polyol obtained by reacting a monoepoxide by using a double metal cyanide complex catalyst in the presence of an initiator.

8. A method comprising forming the polyurethane/polyurethane urea resin according to claim 6 into an artificial leather or an elastic yarn.

9. The method according to claim 6, wherein said chain extender (B) is a polyol or a diamine.

10. The method according to claim 6, wherein said chain extender (B) is a diamine.

11. A method for producing a polyurethane/polyurethane urea resin by reacting an isocyanate group-terminated polyurethane prepolymer (A) obtained by reaction of a high molecular weight active hydrogen compound and a polyisocyanate compound with a chain extender (B) in a solvent and thereafter removing the solvent, wherein the isocyanate group-terminated polyurethane prepolymer (A) is an isocyanate group-terminated polyurethane prepolymer obtained by (a) reacting the following polyol (1) with a polyisocyanate compound in the presence of an excess amount of an isocyanate group, until the reaction is essentially complete, followed by (b) further reacting the following polyol (2) with the reaction product of (a) in the presence of an excess amount of an isocyanate group, wherein the weight ratio of polyol (1)/polyol (2) is from 5/95 to 70/40;

Polyol (1): a polyoxyalkylene polyol having a hydroxyl group value of at most 70, a total unsaturation degree of at most 0.07 meq/g and an oxypropylene group content of at least 70 wt % containing a secondary hydroxyl terminal group, Polyol (2): a polyol selected from the group consisting of polyoxytetramethylene glycol, polyester polyol, polycaprolactone polyol and polycarbonate polyol.

12. The method for producing the polyurethane/polyurethane urea resin according to claim 11, wherein the isocyanate group-terminated polyurethane prepolymer (A) and the chain extender (B) are reacted at a temperature of from 0 to 30° C. in a solvent.

13. The method for producing the polyurethane/polyurethane urea resin according to claim 11, wherein the polyol (1) is a polyoxyalkylene polyol obtained by reacting a monoepoxide by using a double metal cyanide complex catalyst in the presence of an initiator.

14. A polyurethane/polyurethane urea resin prepared by the method according to claim 11.

15. A method comprising forming a polyurethane/polyurethane urea resin according to claim 11 into an artificial leather or an elastic yarn.

16. The method according to claim 11, wherein said chain extender (B) is a polyol or a diamine.

17. The method according to claim 11, wherein said chain extender (B) is a diamine.

\* \* \* \* \*